Jan. 11, 1966   P. H. CARTER   3,229,010
METHOD OF PROVIDING A PREFORMED CLOSURE
MEMBER FOR A CONTAINER
Original Filed March 7, 1963   2 Sheets-Sheet 1
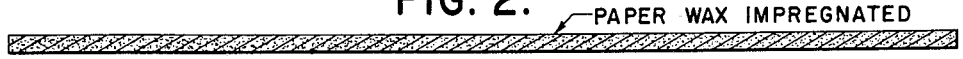
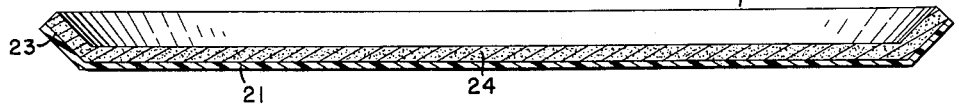
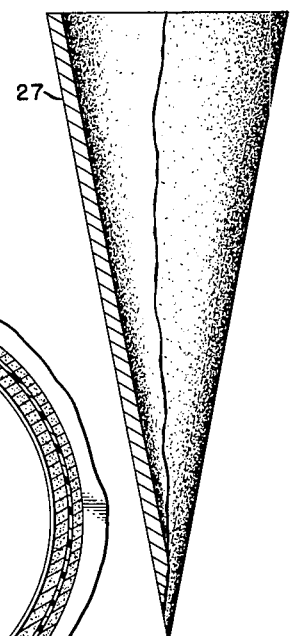
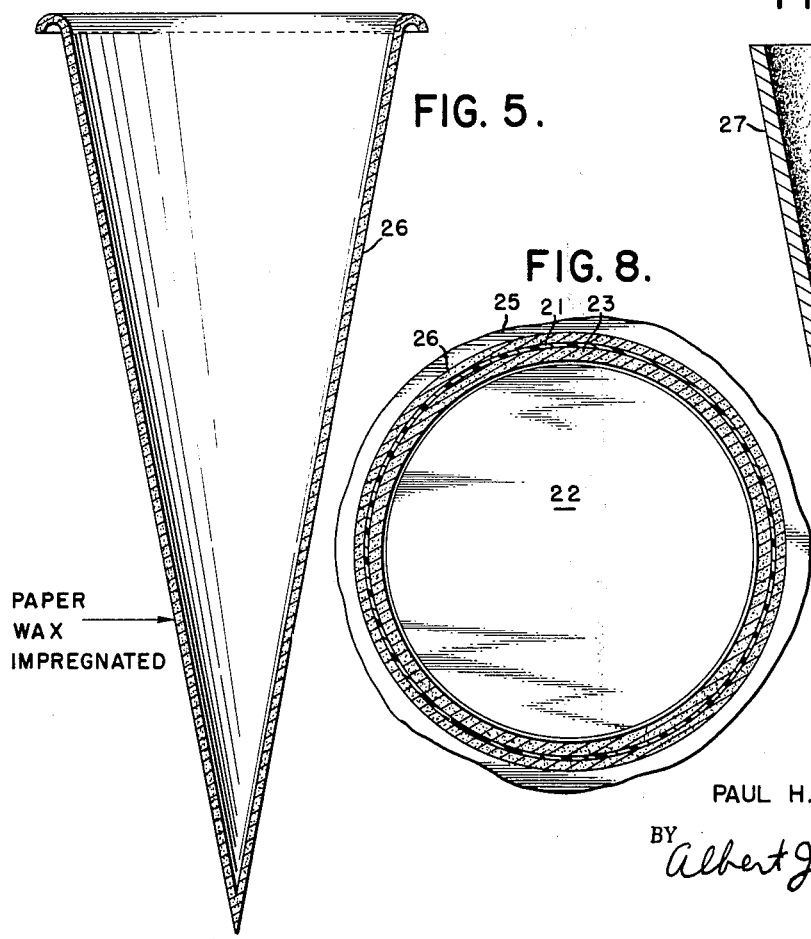
INVENTOR.
PAUL H. CARTER
BY Albert J. Kramer
ATTORNEY

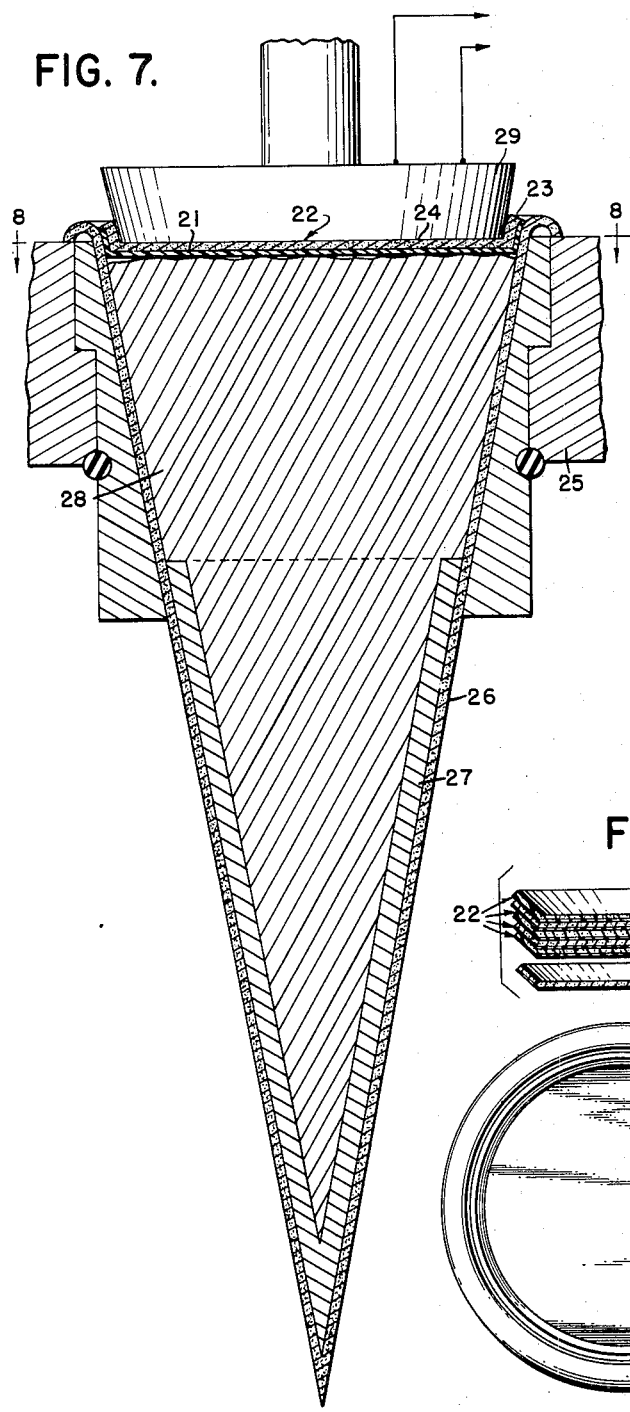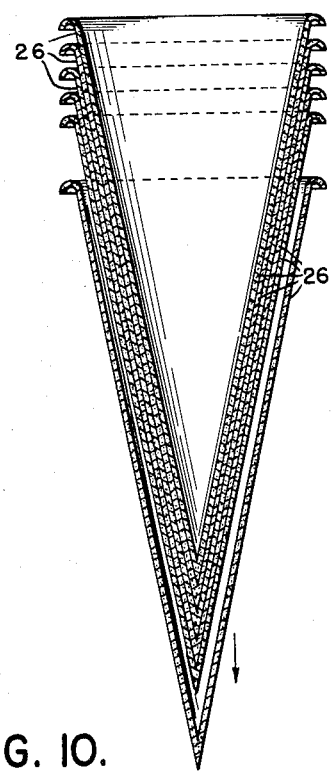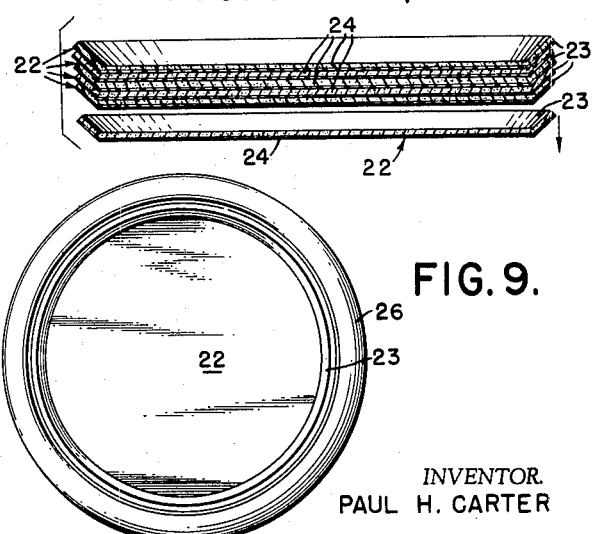
INVENTOR.
PAUL H. CARTER
BY Albert J. Kramer
ATTORNEY

United States Patent Office 3,229,010
Patented Jan. 11, 1966

3,229,010
METHOD OF PROVIDING A PREFORMED
CLOSURE MEMBER FOR A CONTAINER
Paul H. Carter, Baltimore, Md., assignor to Maryland
Cup Corp., Owings Mills, Md., a corporation of Maryland
Original application Mar. 7, 1963, Ser. No. 263,518, now
Patent No. 3,170,568. Divided and this application
Sept. 21, 1964, Ser. No. 409,041
1 Claim. (Cl. 264—136)

This application is a division of Serial Number 263,518, filed March 7, 1963, now Patent No. 3,170,568.

This invention relates to hermetical paper containers and to the provision of lids for such containers.

For the purpose of illustrating the invention, it will be described hereinafter in reference to a popular form of novelty ice cream product, by way of conveient example, and not by way of limitation, it being understood that the invention is not so limited but has broad application in the field of packaging products in paper containers.

In recent years there has been developed what is now a popular form of novelty ice cream product consisting of a pastry cone filled with ice cream and packaged in a conical paper jacket that fits closely about the pastry cone. The popularity of these products resides in many factors. It is essentially a prepackaged ice cream cone. It obviates the customary dipping of ice cream from bulk quantities which is not only time consuming, but requires special equipment and personnel to accomplish. It is also difficult, if not impossible, to accomplish under controlled sanitary conditions.

The prepackaged ice cream cone obviates these deficiencies by providing a product that is completely sanitary, uniform in quality and quantity, easy to market from the retailer's point of view and, moreover, lends itself to the inclusion in the package of ancillary confectionary items, such as chocolate and other syrups, coatings, chopped nuts, coconut shreds and candy.

These ice cream cone packages, typically, comprise a conical paper jacket into which the ice cream cone is placed and a circular lid sealed to the open end of the filled jacket. Various forms of such lids have heretofore been provided and the general object of the invention is a method of providing a closure member for such jackets and similar containers.

Another object of the invention is the provision of a method for producing a closure member having a shape adapted to fit the open end of the container to which it is to be applied.

Other objects are the provision of a method of preforming such a closure so that it will be impervious to moisture, capable of holding its preformed shape until used, and adapted to be readily applied to the container from a stack and rapidly sealed to the container along a continuous annular area.

To explain further the invention and the manner in which it may be practiced, there is illustrated in the accompanying drawing various features.

In the drawing:

FIGURE 1 is a cross sectional view of a circular untreated blank of paper prior to being treated and formed into a lid in accordance with this invention.

FIG. 2 is the same blank after being treated to impregnate it with wax.

FIG. 3 is a similar view of the same wax treated blank to which there has been applied a coating of polyvinyl acetate.

FIG. 4 is the same wax treated and coated blank after being subjected to a die to shape it into the form of a flanged lid ready to be applied to the container.

FIG. 5 is a vertical sectional view of a wax impregnated paper jacket comprising the container for the ice cream confectionary product.

FIG. 6 is an elevational view of an ordinary ice cream cone, partly broken away, to be placed in the jacket and filled with ice cream prior to sealing of the jacket with a lid.

FIG. 7 is a vertical sectional view of a completed packaged ice cream confectionary product in accordance with this invention during application of the heat sealing iron.

FIG. 8 is a cross sectional view along the line 8—8 of FIG. 7.

FIG. 9 is a top plan view of the completed product.

FIG. 10 is an elevational view showing a stack of the lids in nested form to illustrate the manner in which the lids are fed one at a time from the bottom.

FIG. 11 is an elevational view of a stack of paper jackets showing the manner in which they are fed one at a time therefrom.

Referring with more particularity to the drawing, FIGS. 1 to 4 show sequentially the steps of forming the lid. FIG. 1 illustrates a blank sheet of paper untreated, and hence having a definite porosity. The thickness of the paper is exaggerated in the drawing for illustrative purposes, but is actually thin, like a sheet of conventional writing paper, on the order of 0.006 inch. The surface of porous paper of this kind has a relatively high coefficient of friction and, therefore, such untreated blanks are difficult to feed one at a time from a stack. It is necessary that the paper be thin in order to permit it to be formed in a die, such as that shown in patent application, Ser. No. 63,998, filed October 21, 1960, and also to prevent rupture or cracking during the die forming operation.

The untreated paper, however, is wholly unsuited for the purposes of this invention because of its porosity, coefficient of friction, and inability to hold a set shape to which it must be subjected by the die in order to form the required flanged lid. Accordingly, the paper is treated with wax. This is done in the conventional manner by applying to it hot liquefied wax which fills the pores. The impregnated wax is then permitted to cool and become solidified, thus rendering the paper impervious to moisture. The blank thus treated with wax is shown in FIG. 2, the thickness again being exaggerated for purposes of clarification of the disclosure.

The wax impregnated blank is then further treated by the application of a coating 21 of a thermosetting adhesive on the bottom side or what is to become the inner side of the lid 22, one suitable and unique material for this purpose being polyvinyl acetate. The material in the form of a water emulsion or dissolved in an organic solvent, such as acetone, is spread on the surface of the paper and then permitted to dry. The thickness of the resulting coating should preferably be about 0.005 inch. Polyvinyl acetate is especially unique for this purpose because it is compatible with the waxed surface and can be thermoset in a fraction of a second, typically ⅓ of second, at a temperature of about 475° F., but temperatures generally in the range of about 300° to 475° F. for about ½ to ⅓ second may be used. Within this range of temperature and time the wax does not have time to melt and adversely effect the adhesive qualities of the material. Polystyrene can also be used as a substitute for polyvinyl acetate and may be applied in the form of an aqueous dispersion.

After the coating is applied, the blank is then subjected to forming molds to provide a flared peripheral flange 23. During this forming operation creases or folds are created in the flange because the diameter is decreased. In order to provide an acceptable lid that will retain its shape and continuously contact the inner surface of the jacket to which it is to be applied, and thus provide a hermetical package, it is necessary to iron the flange smooth. When this is done after the preconditioning of the blank by the wax and the polyvinyl acetate, it is found that the flange retains its shape and its angular position relative to the remaining part. The fibers of the paper, it appears, are locked in place and held together by the impregnant and coating which retain the central part 24 of the lid in a flat unwarped condition. This is an essential requirement to the handling of stacks of these lids in the filling machine. When other types of lids are used which are warped and not uniform in shapes, it is substantially impossible to handle them by a machine which is designed to handle a given geometrical shape of lid, e.g., circular.

The lids, thus treated and preformed are placed in stacks (see FIG. 10) and from this stacked condition are dispensed one at a time in a filling machine 25 to the upper complementary ends of the jackets 26 after the ice cream cone 27 and ice cream 28 have been placed therein, whereupon the sealing iron 29 is placed on the lid in contact with the flange for a fraction of a second to heat seal the adhesive to the jacket as shown in FIG. 7.

A modified procedure consists in adding to the hot liquid wax before impregnating the jacket paper, about 30%, by weight, of polyethylene. With this impregnation, a polyethylene coating on the lids can be used to the exclusion of both the wax and the polyvinyl acetate or polystyrene, because it has the property of being heat sealable to the wax-polyethylene mixture, as well as the property of sealing the pores of the paper and holding the shape of the lid after molding.

Having thus described my invention, I claim:

The art of providing a preformed closure member for a moisture resistant container of waxed paper, comprising impregnating a blank sheet of paper with wax in an amount to seal the pores thereof against moisture transmission through the paper, coating one side of the blank with thermosetting adhesive selected from polyvinyl acetate and polystyrene, and then bending and pressing a peripheral marginal portion of the blank to provide a flange adapted to conform to the walls of the container along an area to be sealed, said wax and coating being in sufficient amounts to render the flange substantially resilient and capable of retaining a set geometrical shape.

No references cited.

ROBERT F. WHITE, *Primary Examiner.*